United States Patent Office 3,669,745
Patented June 13, 1972

3,669,745
ACCUMULATOR ELECTRODE WITH CAPACITY FOR STORING HYDROGEN AND METHOD OF MANUFACTURING SAID ELECTRODE
Klaus Beccu, Onex, Geneva, Switzerland, assignor to Battelle Memorial Institute, International Division, Carouge, Geneva, Switzerland
No Drawing. Continuation of abandoned application Ser. No. 726,234, May 2, 1968. This application Apr. 24, 1970, Ser. No. 29,740
Claims priority, application Switzerland, May 2, 1967, 6,333/67
Int. Cl. H01m 35/02
U.S. Cl. 136—20                 2 Claims

ABSTRACT OF THE DISCLOSURE

An accumulator electrode with capacity for storing hydrogen, having an active component constituting at least 40% by weight of the electrode and consisting of a hydride of a metal belonging to the third, fourth or fifth group of transition elements. The electrode further contains nickel, copper, silver, iron or chrome-nickel steel alloyed with the active component and comprises a metallic supporting structure. A method of manufacturing this electrode, comprises preparing a metal powder containing the active component and said other metal and sintering said powder in hydrogen at 700 to 1000° C.

This application is a continuation of Ser. No. 726,234 filed May 2, 1968 now abandoned.

Various accumulators such as the Pb/PbO$_2$, Ni/Cd and Ag/Zn type are known, in which the active electrode components have the property of readily taking up and givnig off oxygen. In the majority of such reversible electrodes, which are also called oxide electrodes, the degree of oxidation may, however, only vary by at most two valencies, so that only one oxygen atom may be taken up or given off per metal atom. As most of such oxide forming absorbing metals are relatively heavy and bulky, the storage capacity of known accumulators with oxide electrode systems is relatively low with respect to weight and volume. The low conductivity of the oxide layers further requires mounting them in the form of extremely thin layers on porous supporting structures having a large surface so as to keep polarization of the electrodes low. Various chemical or physical reactions also occur between the oxide electrodes and the electrolyte so that such electrodes only have a limited useful lifetime.

In view of the above described disadvantages of known oxide electrode systems, the use of porous Raney-nickel electrodes in an alkaline accumulator has been proposed for storing hydrogen in chemisorbed form at the grain boundaries and in the pores. The pores are formed in the electrode in this case by dissolving the inactive Raney component, e.g. aluminum, whereby the resulting lattice dislocations lead to a high catalytic activity at the pore surface and grain boundaries. However, through recrystallization, due especially to slight temperature rise, the lattice dislocation sites soon lose their activity and thereby their capacity for storing hydrogen. After repeated hydrogen charge and discharge, Raney metals thus have a storage capacity of at most 0.2 H atoms per metal atom, which corresponds to about 80 ampere-hours per kilogram of metal. Compared with known oxide electrodes, a half-cell electrode with such storage capacity does not, however, provide any advantages for use in electrical accumulators. A further disadvantage of known Raney-nickel electrodes is the lack of stability of the discharge potential, whereby only a slight portion of the storage capacity may be utilized effectively.

It is further known to use alloys of nickel and titanium for activating hydrogen in fuel cells. The alloys proposed for this purpose contain at least 60% and on the average 80-90% nickel by weight. However, alloys with such a composition, which give compounds between TiNi and TiNi$_3$, do not have any or, at best, have only an extremely slight capacity for storing hydrogen since the interstitial sites, which can be occupied by hydrogen in pure titanium, are largely taken up by nickel in these alloys.

The object of the present invention is to provide an accumulator electrode which allows large amounts of hydrogen to be taken up and delivered at high rates and over a long period and which, when discharging, promotes the rapid electrochemical oxidation of the hydrogen to water in an alkaline electrolyte.

The accumulator electrode with capacity for storing hydrogen according to the invention comprises an electrode body with a large active surface, at least 40% by weight of which is formed by an electrochemically active component consisting of a hydride of at least one metal belonging to the third, fourth or fifth group of transition elements of the Periodic System, said electrode body further containing at least one metal belonging to the group: nickel, copper, silver, iron, and chrome-nickel steel for activating hydrogen and for mechanical consolidation of said body, said metal being alloyed with said active component, at least at said active surface, and said electrode further comprising a metallic structure providing mechanical support and current conduction embedded in said electrode body.

The invention also relates to a method of manufacturing this accumulator electrode. This method comprises the steps of preparing a metal powder of which at least 40% by weight consists of the hydride forming said active component and which contains at least one of the said metals for activating hydrogen and for mechanical consolidation, embedding a metallic structure in said powder and sintering said powder together, in the presence of hydrogen and at a temperature lying between 700 and 1000° C., to obtain an electrode body having the desired shape.

Metals of the fourth group of transition elements are particularly suitable for taking up large amounts of hydrogen, the ratio by weight of metal to hydrogen being particularly favorable in the case of the titanium hydride TiH$_2$. The metals of the third and fifth groups of the transition elements on the other hand have favorable properties in relation to a low activation energy for hydride formation and decomposition, thus rendering them particularly suitable for hydrogen absorption and delivery without electrochemical polarization. It is thus advantageous to use in the present invention as active, i.e. hydrogen-storing components, mixtures consisting of titanium hydride or zirconium hydride and hydrides of the rare earths, e.g. cerium hydride and lanthanum hydride, or mixtures of titanium hydride with vanadium hydride or tantalum hydride.

In contrast with the storage of hydrogen in activated Raney-nickel, in the accumulator electrode according to the invention, hydrogen is substantially bound interstitially in hydride form so that this electrode may be termed a hydride electrode. The capacity for storing hydrogen is not impaired in such electrodes due to any recrystallization of the storage metal which may occur, e.g. as a result of a rise in temperature.

It has been found that a capacity for storing hydrogen which is advantageous for use in accumulator electrodes only begins to appear when at least 40% by weight of the electrode body consists of the active component.

The function of storing hydrogen in an electrode which may be electrochemically charged and discharged requires at the same time an unhindered absorption and delivery of hydrogen, i.e. which occur with slight polarization and electrodes with the above given compositions have proved most suitable. The presence of one of the said hydrogen activating metals in alloyed form with the active component ensures not only rapid hydrogen transfer but also a high mobility of the hydrogen within the metal. Whereas the capacity for storing hydrogen is slightly reduced as compared to the pure active component, the alloy formation thereof with said hydrogen activating metal alloys the hydride electrode to be charged and discharged with only low polarization. Hence a favorable cell potential and rapid cathodic charging of the electrode with little over voltage are obtained even with high discharge current densities.

Owing to the properties of high specific hydrogen storage capacity and of hydrogen transfer with low polarization, which are thus obtained in combination for the first time, the accumulator electrode according to the invention is particularly suitable for storing energy electrochemically in electrical accumulators. The interstitial storage of hydrogen has, however, a side effect, namely a lattice dilatation of the hydrogen storing metal and thus produces mechanical stresses therein. So as to enable the electrode body to keep its mechanical rigidity and to ensure satisfactory electric conduction to be obtained throughout the electrode, even when charging and discharging repeatedly, it is necessary to embed a metallic supporting structure in the electrode. For the same purpose of ensuring satisfactory rigidity, small amounts of an elastic plastic material may also be incorporated in the electrode. To this effect, the latter may include 5% by weight of polyethylene.

In spite of the high mobility of the hydrogen which is interstitially bound in the metal in the present case, it is advantageous to keep the paths which the hydrogen atoms have to cover by solid-state diffusion as small as possible so as to ensure a rapid transport from and to the innermost regions of the electrode body. If the atomic hydrogen can cover a great part of its path along the grain boundaries before reaching its interstitial position, the overall diffusion process is substantially promoted. Measures may be taken for promoting the formation of grain boundaries in a desirable manner to this effect. This may be done, for example by manufacturing the electrode by sintering and subsequent rapid cooling.

For the same purpose, substances may be incorporated in the electrode body, which are deposited at the grain boundaries in the metal due to their low solubility. To this effect, metallic oxides such as MgO, $ThO_2$ and $TiO_2$, metallic carbides such as TiC and WC, metallic borides such as TiB or metallic nitrides such as TiN are suitably added to the electrode composition in amounts constituting less than 10% by weight thereof. Besides the desired grain boundary formation, such substances also have an activating effect on the hydrogen diffusing from the gas phase into the metal.

The accumulator electrode according to the invention may preferably consist of a porous sintered body. The latter may be manufactured by mixing a metallic hydride powder with a powdered metal for activating hydrogen and mechanical consolidation and then sintering together the powder mixture on a supporting structure at a temperature lying between 700 and 1000° C. so as to obtain a sintered electrode body having the desired shape. Temperatures in this range lead to alloying, at the surfaces of contiguous particles, between the metallic hydride and the activating metal. The latter thus diffuses, in dependence on the duration of the sintering process, into the metallic hydride particles, thus producing a diminishing concentration gradient of the activating metal from the surface towards the interior of the hydride particles. Such a porous sintered body has a large active surface and allows the exchange of hydrogen between the electrolyte and the active component of the electrode to occur readily. So as to increase the porosity of the sintered body, a further component may be added which is either eliminated after sintering, e.g. sodium sulphate or sodium silicate, is volatile at the sintering temperature, e.g. urea or polyvinyl alcohol, or is reduced by the sintering atmosphere while undergoing a reduction in volume, e.g. nickel hydroxide or iron hydroxide.

The manufacture of the accumulator electrode according to the invention is illustrated in the three examples below.

EXAMPLE 1

Powdered titanium hydride (particle size $<20\mu$) is mixed with about an equal amount of nickel powder ($<40\mu$), water and sodium silicate as binder to obtain a uniform pasty mass. This mass is then applied onto a supporting grid consisting of nickel-coated steel wire netting so as to obtain the desired shape of the electrode body. After drying in air at 100° C. so as to remove the water, the electrode body is sintered together in a hydrogen atmosphere at 900° C. After dissolving out the binder in 10%-NaOH solution, the finished electrode body with a porosity of about 20% is obtained.

EXAMPLE 2

Titanium hydride powder is mixed with particles of tantalum hydride and nickel powder in a ratio of 4:1:5, the average particle size of the various constituents being less than $20\mu$. The powder mixture thus obtained is mixed with water and sodium sulphate as binder to provide a uniform, pasty mass. This mass is then applied onto a supporting grid consisting of nickel-coated steel wire. The electrode body thus obtained is then dried in air to remove the water and then sintered at 900° C. After dissolving out the binder in water, the finished electrode body is obtained as a sintered mass having fine pores, the porosity being about 20%.

EXAMPLE 3

A powder mixture is prepared which has a composition by weight of 70% titanium hydride, 25% nickel and 5% tungsten carbide, the particle size of the various constituents lying below $20\mu$ throughout. The powder mixture is sintered at about 1000° C. in vacuum in a first sintering operation and the resulting sintered body is then cooled down in presence of hydrogen, finely ground and finally used for manufacturing the electrode body in a second sintering operation in the manner described in Example 2. A uniform distribution over a whole electrode mass of the alloy phases formed by sintering is thus ensured.

The accumulator electrode according to the invention may be advantageously used for storing energy in an electrochemical cell by arranging it, together with a counter-electrode delivering oxygen, in an alkaline, aqueous electrolyte, e.g. in 20% —KOH solution. The hydrogen bound in hydride form is thus reversibly exchanged near the potential of the hydrogen electrode, which corresponds to the pH-value of the electrolyte used. Thus charging or hydride formation can be carried out by applying a voltage at least equal to the dissociation voltage of water between the hydride electrode and the counter-electrode which has a potential differing from that of the hydride electrode and may in some cases be an oxide electrode, the hydrogen liberated at the hydride electrode being absorbed by the hydride forming metal. When discharging or dehydrogenating the hydride electrode in the electrochemical cell, the hydrogen diffusing out of the metallic hydride is oxidized to water at the boundary surface between electrode and electrolyte. The chemical energy liberated during this process appears as electrical energy, i.e. as current flow between the two electrodes. During the discharging operation, i.e. when dehydrogenating the hydride electrode, it is advisable to leave a remaining portion of hydrogen in the electrode so as not to annul the passivation of the electrode with regard to the electrolyte, thus avoiding the irreversible formation of undesirable metal oxides. This may be done by subjecting the hydride electrode, when discharging, to a polarization which is less than +500 mv. with respect to the equilibrium potential. It has been found advantageous to operate the cell at a temperature between 50 and 100° C. when it is required to supply or extract the electrical energy in a short period of time as this allows the speed of hydrogen diffusion from the surface into the metal, and vice versa, to be substantially increased.

The degree of charge of the electrode can be controlled by means of the density of the electrolyte since water is consumed to form hydrogen when charging and is produced by recombination of hydrogen and oxygen when discharging.

What is claimed is:

1. An alkaline accumulator having a negative hydrogen-storage electrode and a positive oxygen or oxide electrode, said negative electrode consisting essentially of a solid porous electrode body with a large active surface wherein:

said body comprises an electrochemical active component consisting of a hydride of at least one transition metal selected from Groups III, IV and V of the Periodic System;

said component forming between 40% and 70% by weight of said electrode body;

said component being alloyed with at least one additional metal for activating hydrogen and providing mechanical support, said additional metal being selected from the group consisting of nickel, copper, silver, iron and chrome-nickel steel, said additional metal being diffused into the metallic hydride, the hydrogen being bound interstitially in the hydride; and a metallic structure embedded in said electrode body to provide improved mechanical support and current conduction during electrochemical discharge and recharge.

2. An accumulator according to claim 1, wherein said electrode body consists essentially of titanium hydride alloyed with nickel in a ratio of about 60:40 parts by weight.

References Cited

UNITED STATES PATENTS

| | | | |
|---|---|---|---|
| 3,207,600 | 9/1965 | Hirai et al. | 136—86 D |
| 3,294,586 | 12/1966 | Le Duc | 136—120 FC |
| 3,311,508 | 3/1967 | Biddick et al. | 136—120 FC |
| 3,382,106 | 5/1968 | Jung et al. | 136—120 FC |
| 3,423,248 | 1/1969 | Heinz-Gunther Plust | 136—120 FC |

FOREIGN PATENTS

| | | | |
|---|---|---|---|
| 956,292 | 4/1964 | Great Britain | 136—120 FC |
| 1,340,521 | 9/1963 | France | 136—120 FC |

WINSTON A. DOUGLAS, Primary Examiner

C. F. LeFEVOUR, Assistant Examiner

U.S. Cl. X.R.

136—86 D, 120 R

UNITED STATES PATENT AND TRADEMARK OFFICE
Certificate

Patent No. 3,669,745                                         Patented June 13, 1972

Klaus Beccu

Application having been made by Klaus Beccu, the inventor named in the patent above identified, and Battelle Memorial Institute, International Division, Carouge, Geneva, Switzerland, the assignee, for the issuance of a certificate under the provisions of Title 35, Section 256, of the United States Code, adding the name of Rudolf Siegert as a joint inventor, and a showing and proof of facts satisfying the requirements of the said section having been submitted, it is this 30th day of September 1975, certified that the name of the said Rudolf Siegert is hereby added to the said patent as a joint inventor with the said Klaus Beccu.

FRED W. SHERLING,
*Associate Solicitor.*